United States Patent [19]

Lutz et al.

[11] 4,258,635
[45] Mar. 31, 1981

[54] SOIL CULTIVATION IMPLEMENT

[75] Inventors: Claus Lutz, Rottweil; Bernhard Beha, Unterkirnach; Heinz G. Nieter, Kleinweiherle 7, 7239 Epfendorf 3, all of Fed. Rep. of Germany

[73] Assignees: Claus Lutz, Rottweil; Bernhard Beha, Unterkirnach; Heinz Gernot Nieter, Epfendorf; Helmut Steinhilber, Rottweil, all of Fed. Rep. of Germany

[21] Appl. No.: 902,765

[22] Filed: May 3, 1978

[30] Foreign Application Priority Data

May 3, 1977 [DE] Fed. Rep. of Germany ....... 2719713

[51] Int. Cl.³ .............................................. A01C 7/00
[52] U.S. Cl. ........................................ 111/52; 111/85;
172/68; 172/70; 172/123; 172/177; 172/730
[58] Field of Search ........................ 172/63, 68, 70, 71,
172/123, 155, 159, 145, 146, 149, 151, 166, 174,
175, 177, 179, 184, 196, 538, 548, 724, 730, 713,
686, 697, 60, 730, 47, 49, 52, 59, 537, 539, 548,
556, 699, 700, 703, 50, 51, 119, 121, 122, 39, 67,
747; 111/1, 11, 85, 87, 34, 54, 52

[56] References Cited

U.S. PATENT DOCUMENTS

| 1,661,692 | 3/1928 | Everist | 172/548 X |
| 1,830,565 | 11/1961 | Schaeffers | 172/49 |
| 2,366,571 | 1/1945 | Riddle | 172/123 |
| 2,580,236 | 12/1951 | Mascaro | 172/548 |
| 2,882,983 | 4/1959 | Hill | 172/730 |
| 3,297,096 | 1/1967 | Wooldridge | 172/537 |
| 3,998,276 | 12/1976 | MacMillan | 111/1 |
| 4,152,993 | 5/1979 | Van der Lely | 111/85 X |

FOREIGN PATENT DOCUMENTS

| 24443 | 9/1936 | Australia | 172/548 |
| 527579 | 9/1927 | Fed. Rep. of Germany | 172/49 |
| 2065170 | 1/1973 | Fed. Rep. of Germany | 172/713 |
| 15215 | 5/1912 | France | 172/539 |
| 2343409 | 10/1977 | France | 172/123 |
| 250197 | 2/1964 | Netherlands | 172/730 |
| 6800520 | 7/1969 | Netherlands | 172/177 |
| 7400416 | 7/1975 | Netherlands | 111/6 |
| 1328762 | 9/1973 | United Kingdom | 172/49 |
| 378152 | 4/1973 | U.S.S.R. | 111/1 |
| 372957 | 8/1973 | U.S.S.R. | 172/730 |

Primary Examiner—Edgar S. Burr
Assistant Examiner—James R. Feyrer
Attorney, Agent, or Firm—Lackenbach, Lilling & Siegel

[57] ABSTRACT

A soil cultivation implement comprising a frame adapted to be coupled to a drive means, and said frame supporting, one behind the other in the direction of travel, first cutting means for cutting the ground substantially vertically, second cutting means for dividing the ground substantially horizontally and lifting it in a rearward direction, and a substantially horizontal rotor. The rotor is provided with power means from said drive means and is adapted to be driven rotationally and provided with prongs for penetrating the surface of the ground. The prongs are disposed helically on a rotor shaft in a least three rows staggered uniformly in relation to one another in the peripheral direction. The prongs are further substantially rectilinear and rigidly fastened substantially tangentially on the rotor shaft. Furthermore the prongs enclose in relation to the radii associated with their fastening points an angle of less than 90°, the length of each prong being substantially in the proportion of 2:1 to the diameter of the rotor shaft and the prongs are pointed at their outer ends and curved in blade form in the direction of rotation.

20 Claims, 13 Drawing Figures

SOIL CULTIVATION IMPLEMENT

BACKGROUND OF THE INVENTION

The present invention relates to a soil cultivation implement comprising cutting means for dividing the soil vertically and horizontally and a horizontally mounted rotor provided with prongs and arranged to be driven in a direction opposite to the direction of travel of the implement.

For the cultivation of the soil use is generally made of plows, hoes, rotary cultivators, harrows, fertilizer spreaders, spraying machines for distributing weed killers and pesticides, sowing machines, compacting rollers, and similar specialized implements.

These specilized machines and implements are very suitable for their determined purposes, but are not capable of universal use. This however means that according to the methods customary at the present time the ground has to be cultivated with the individual specialized implements one after the other in a very time-consuming manner.

There has been no lack of attempts to combine individual specialized implements in a single implement in order to be able to carry out various operations for the cultivation of the ground simultaneously, thus saving working time.

The practical realization of these theoretically known combinations has previously always failed because of the enormous power required for an appliance of this kind.

The present invention seeks to reduce the power required by a universal soil cultivation implement.

SUMMARY OF THE INVENTION

According to the present invention there is provided a soil cultivation implement comprising a frame adapted to be coupled to a drive means, and said frame supporting, one behind the other in the direction of travel, first cutting means for cutting the ground substantially vertically, second cutting means for dividing the ground substantially horizontally and lifting it in a rearward direction, and a substantially horizontal rotor arranged to be driven rotationally and provided with prongs for penetrating the surface of the ground. The prongs are disposed helically on a rotor shaft in at least three rows staggered uniformly in relation to one another in the peripheral direction, and the prongs are substantially rectilinear and rigidly fastened substantially tangentially on the rotor shaft. Also, the prongs enclose in relation to the radii associated with their fastening points an angle of less than 90°, and the length of each prong is substantially in the proportion of 2:1 to the diameter of the rotor shaft. Furthermore, the prongs are pointed at their outer ends and curved in blade form in the direction of rotation.

Preferably, the prongs are disposed in five rows and the angle enclosed by each prong and the associated radius is between 50° and 80°.

In an embodiment the pronged rotor is arranged to rotate at from 100 to 800 revolution per minute with a working speed of from 3 to 10 kilometers per hour. For normal soils the speed of rotation is expediently 250 revolutions per minute and the speed of travel about 5 kilometers per hour. The rotational speed and working speed and also the depth of penetration of the prongs will however be adapted from case to case to the ground which is to be cultivated, and for this reason are variable. Thus, the pronged rotor is also connected to the implement frame in such a manner as to be adjustable in height.

The power required by the soil cultivation implement of the invention is in addition decisively affected by the arrangement and conformation of the share cutters forming the first cutting means.

It would be a self-suggesting step to make these share cutters in the form of plow shares. It has however been found that the customary plow share offers substantial resistance to forward movements. In order to reduce this resistance, it is proposed that the share-like cutters should be formed in a manner known per se with cutting edges which are disposed at an acute angle with respect to one another and symmetrically with respect to the longitudinal axis, these cutting edges enclosing an angle of from 60° to 90°, preferably of 75°, and having at their front end (in the working direction) an angle of inclination in relation to the horizontal of only about 10° to 30°.

As the soil cultivation implement advances these cutters cut through the ground horizontally and lift the separated portion of ground slightly upwards on its path towards the rear above the cutters. It is not necessary for the ground to be turned over as in the case of a plow, because this operation will be attended to by the following pronged rotor which grips the portions of soil and throws them backwards, whereby they are loosened, turned, crumbled, and aerated.

However, in order that the flat share cutters will not slide over the ground but will be reliably pulled into it, they are provided at their front ends (in the working direction) with an undercutter which in relation to the horizontal has a greater inclination than the cutting edges, preferably of about 30°. With this arrangement the share cutters penetrate as deeply into the ground as is permitted by a preceding supporting roller, which for adjustment purposes is mounted so that it can be varied in height. The supporting roller may in turn be equipped with cutting rings which cut up residues of plants, roots, or the like and assist the crumbling of the ground.

Further details of the share cutters are explained below with reference to the embodiment illustrated.

Particularly with soil cultivation implements which have a long overhang it is advisable for another roller, in the form of a freely rotating supporting roller, to be disposed at the rear end (in the direction of travel). This supporting roller necessarily leads to a superficial compaction of the cultivated soil, which is in particular desirable when, as is further proposed, fertilizers, weed killers, or pesticides or seed material are dispensed in liquid or granular form in the same operation.

An embodiment of a soil cultivation implement of the invention has the following advantages:

1. It is possible to perform several tasks simultaneously in the same operation, which results in economical, biological, physical, and finally financial advantages, while the special measures permit the use of a tractor or drive of conventional power.

2. The ground can be cultivated fundamentally better and therefore more effectively, that is to say crumbled, mixed, and distributed, immediately after being loosened.

3. Fertilizers, weed killers, and pesticides act more effectively if they are worked directly into the freshly cultivated soil.

4. The seed germinates more uniformly because the loosened ground is not compacted by the track of a tractor preceding the sowing shares.

5. Plant residues and manure are generally more easily decomposed because they are uniformly mixed throughout the topsoil, whereas in the case of plowing they are simply deposited in one layer, which may for example lead to the formation of mold.

6. With a soil cultivation implement of the invention root-propagated weeds are effectively attacked since they are brought to the surface where they will dry out.

7. No plowing furrows or other unevenness is left in the cultivated soil. The driving wheels of the tractor do not run in a furrow as in the case of a plow, so that compaction of the plow pan is avoided. Horizontal hoeing knife compaction, which usually occurs in rotary hoeing, is also avoided.

The tools mounted on the soil cultivation apparatus of the invention, particularly the pronged rotor, the front supporting roller, and the rear clod-breaking roller are advantageously adjustable in height, so that the depth of cultivation can be adapted to varying ground conditions.

BRIEF DESCRIPTION OF THE DRAWINGS

An embodiment of the present invention will hereinafter be described, by way of example, with reference to the accompanying drawings, in which.

DESCRIPTION OF THE PREFERRED EMBODIMENTS

In the drawings, dimensions and particularly angles of the implement which are of particular importance are marked.

Figure 1:
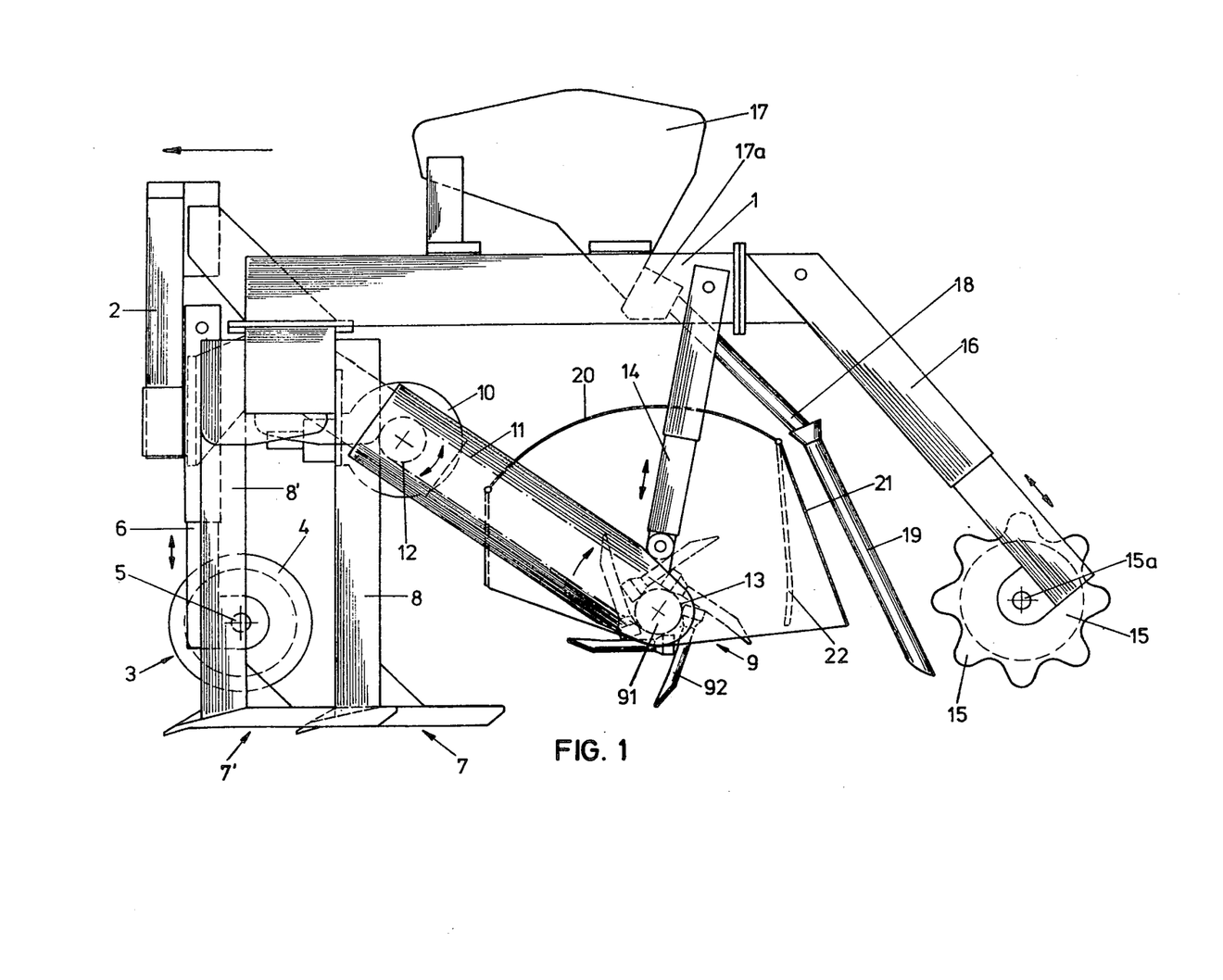
FIG. 1 shows diagrammatically a side view of a soil cultivation implement of the invention.
Figure 2:
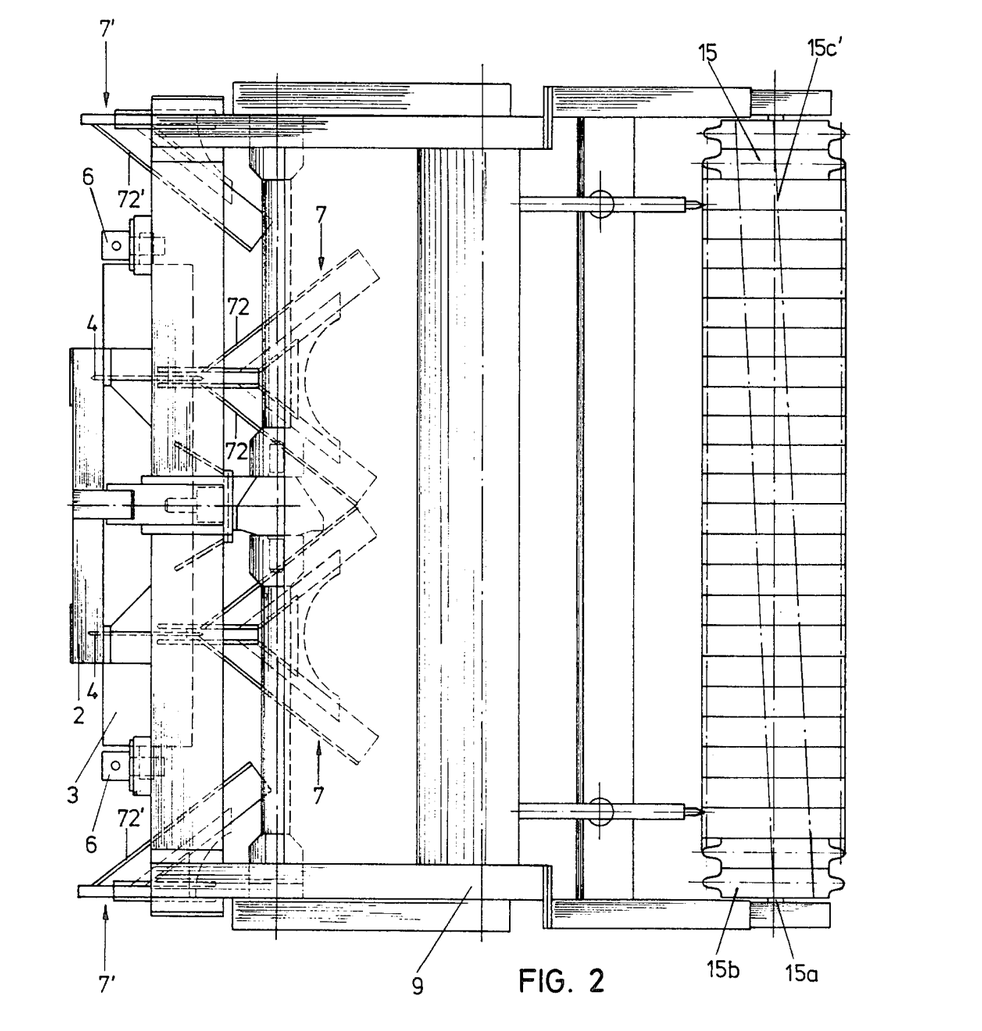
FIG. 2 shows a plan view of the soil cultivation implement of FIG. 1.
Figure 3:
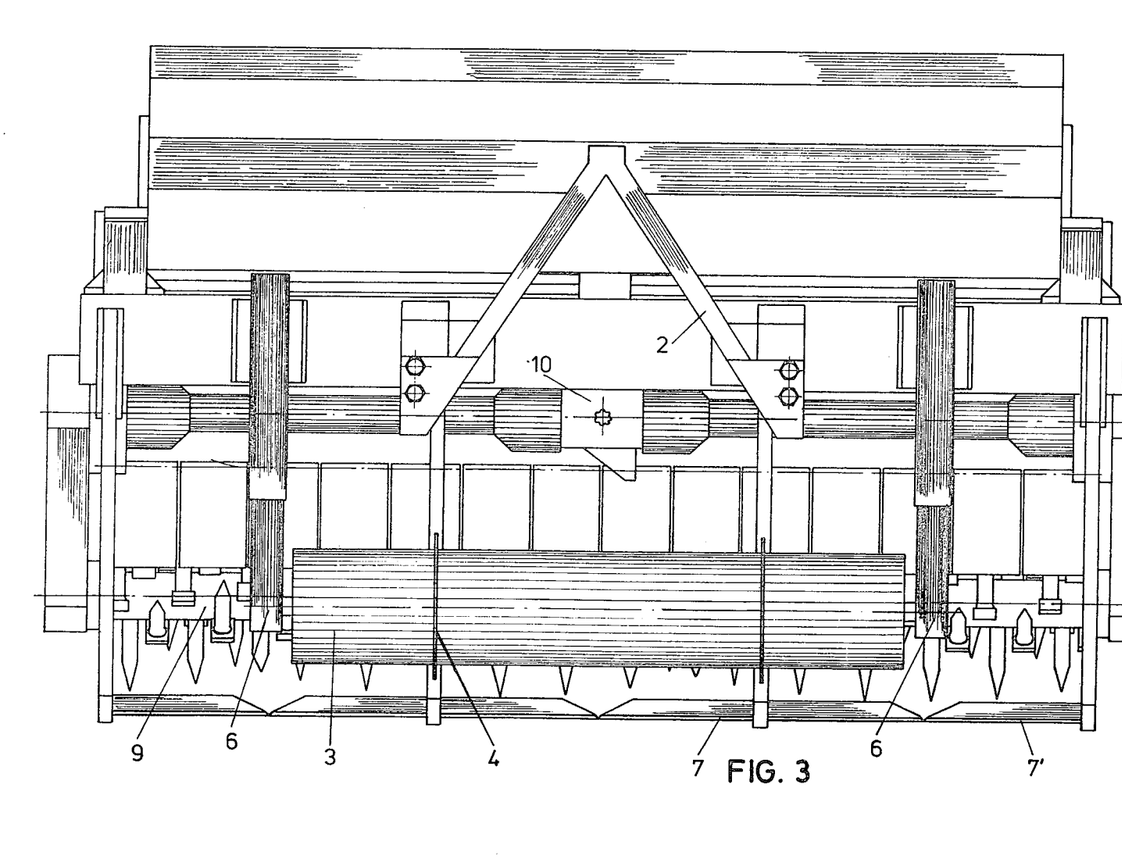
FIG. 3 shows a front view of the soil cultivation implement of FIGS. 1 and 2.
Figure 4:
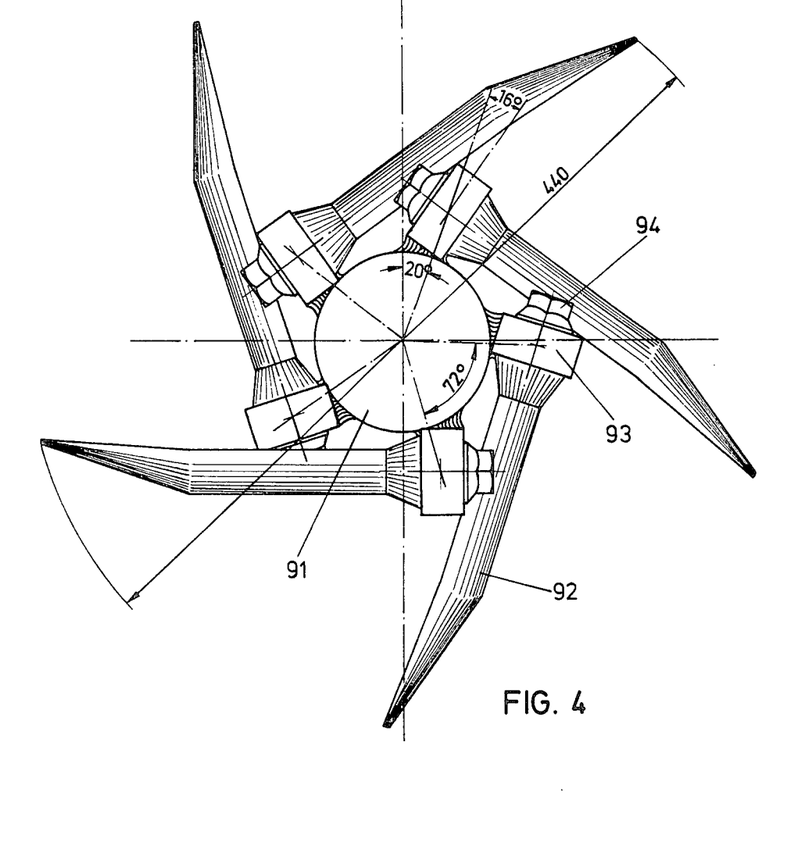
FIG. 4 shows a side view of a pronged rotor of the implement of FIGS. 1 to 3.
Figure 5:
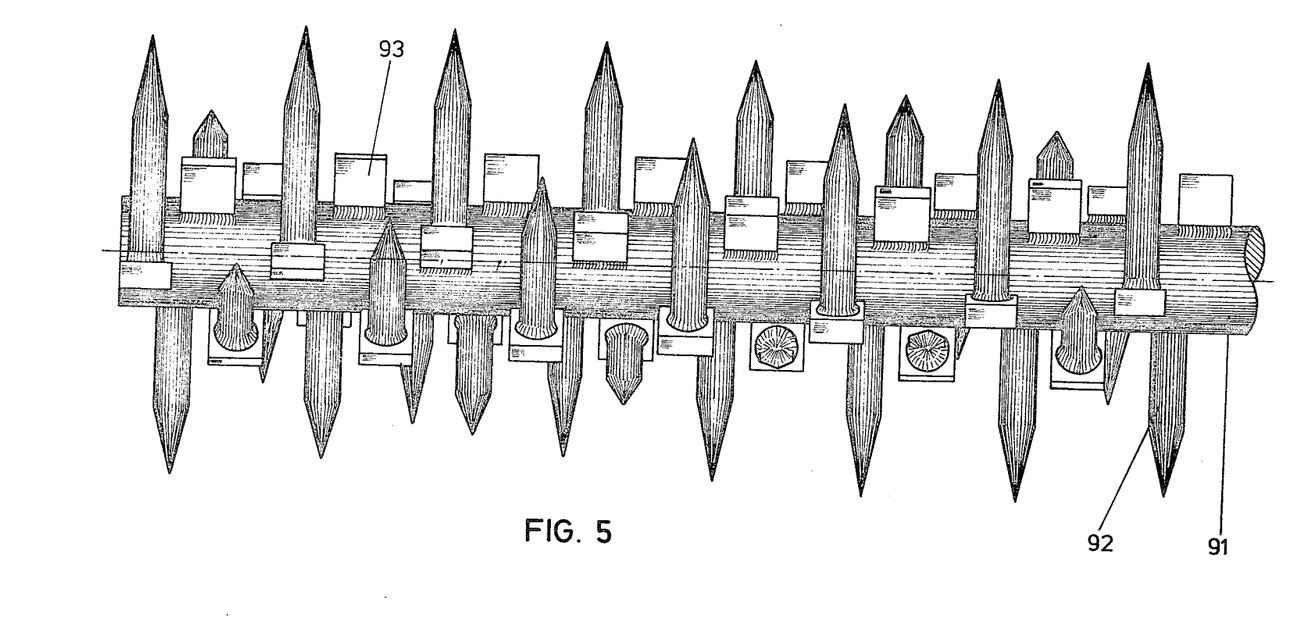
FIG. 5 shows a front view of the pronged rotor shown in FIG. 4.
Figure 6:
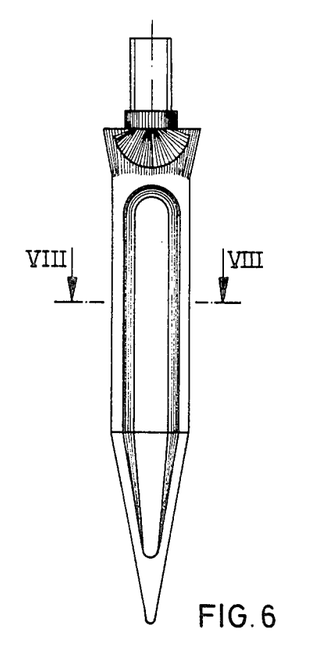
FIG. 6 shows a plan view on a larger scale of a rotor prong.
Figure 7:
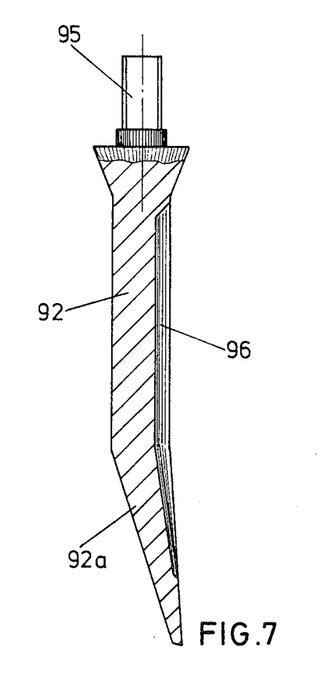
FIG. 7 shows a side view, partly in section, of the rotor prong shown in FIG. 6.
Figure 8:
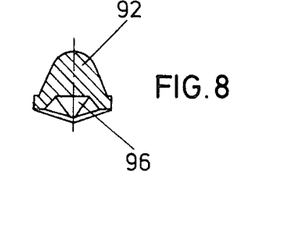
FIG. 8 shows a section taken along line VIII—VIII of FIG. 6.
Figure 9:
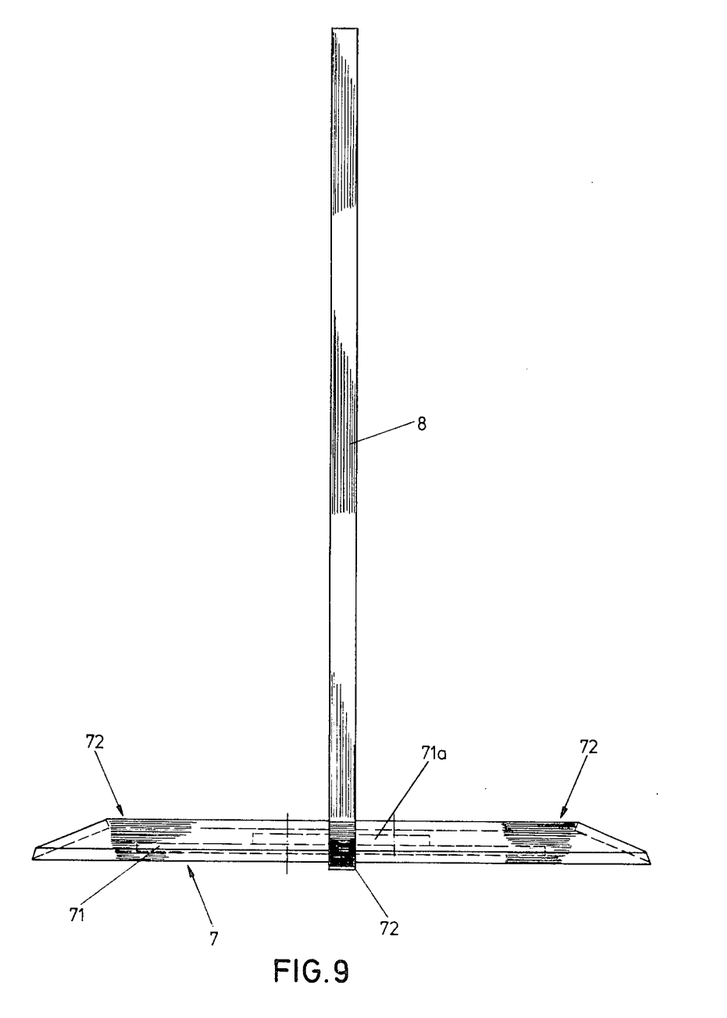
FIG. 9 shows a front view of a cutter share of the implement of FIGS. 1 to 3.

FIGS. 1 to 3 of the drawings show the overall construction of a soil cultivation implement constructed in accordance with an embodiment of the present invention.

This implement comprises a frame 1 which by means of a coupler 2 can be coupled to a tractor or similar towing device. Alternatively, the implement can be provided with its own drive which would be coupled to the frame 1. The front of the implement (considered in the direction of travel) is carried by a supporting roller 3 whose axle 5 is mounted at both ends in vertically ajustable roller carriers 6 which are joined to the frame 1. The supporting roller 3, is equipped with annular cutters 4 which are disposed on its periphery. These cutters 4 first cut up the ground vertically, whereby any plant residues in the ground are comminuted in the middle region of the implement so that the risk of plugging is avoided. The supporting roller 3 not only prevents the implement from sinking too deeply into the ground but also serves after the style of known cutters to prepare the ground which is to be cultivated.

Figure 10:
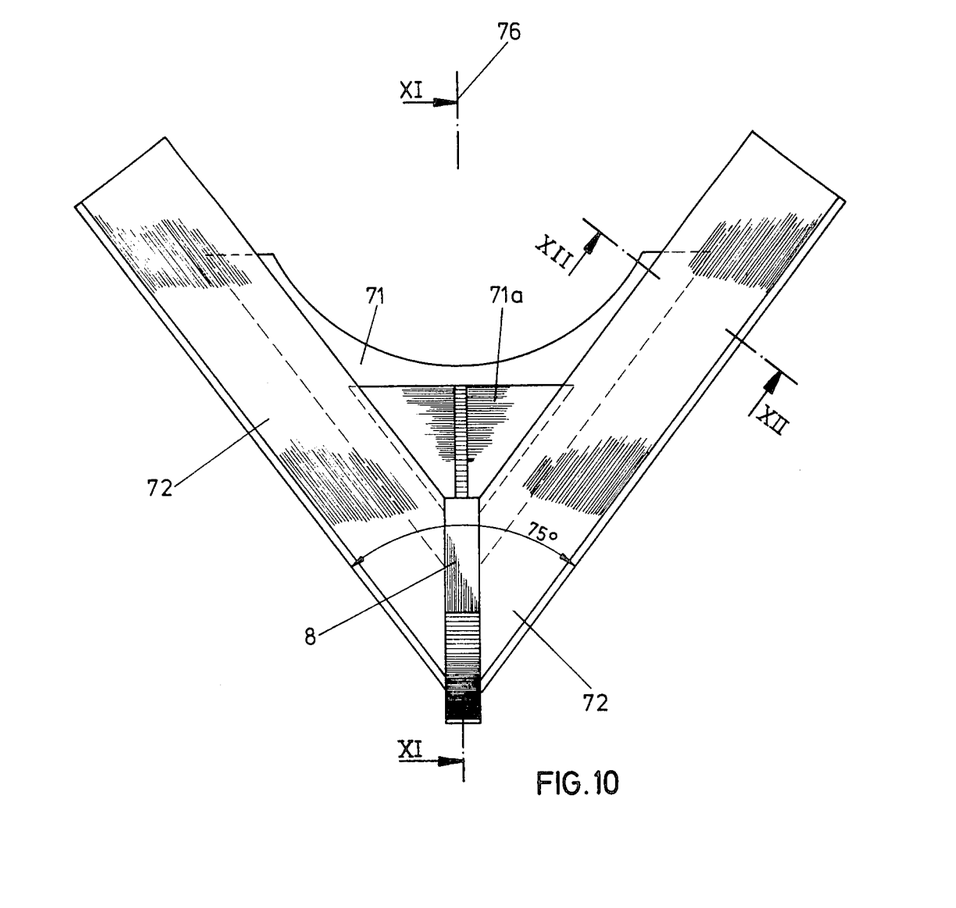
FIG. 10 shows a plan view of the cutter share of FIG. 9.

On both sides of the supporting roller 3 and behind it are disposed share cutters 7' and 7. The outer share cutters 7' each have only one inwardly directed cutting edge 72', whereas the share cutters 7 disposed behind the supporting roller 3 each have two cutting edges 72 disposed symmetrically about a center line 76 (FIG. 10) of the respective share cutter 7. The inner share cutters 7 are disposed so that their center lines are each in alignment with a center line of a respective annular cutter 4 provided on the supporting roller 3. Details of these share cutters are described more fully hereinbelow with reference to FIGS. 9 to 13. The share cutters 7 and 7' are connected to the frame 1 by means of respective cutter holders 8 and 8'.

The purpose of these share cutters is to divide the ground horizontally so that it is already loosened when it comes into the working region of a pronged rotor 9.

The pronged rotor 9 is the tool which actually cultivates the soil in the implement illustrated. It consists of a rotor shaft 91 on which there are mounted, distributed over its periphery, prongs 92 which extend approximately tangentially with respect to the shaft 91 and which are curved like blades in the direction of rotation. The pronged rotor 9 is rotated through gearing 10 by the power takeoff shaft of the tractor with the aid of a chain 11 and chain wheels 12 and 13. The direction of rotation of the rotor 9 is opposite to the direction of advance, that is to say in the clockwise direction in the case illustrated in FIG. 1, where the implement travels in the direction from right to left.

The details of this pronged rotor will be further described hereinbelow with reference to FIGS. 4 to 8.

The pronged rotor 9 is connected to the frame 1 by means of vertically adjustable rotor carriers 14.

Above and behind the rotor 9 are disposed baffle plates 20 and 21 which are arranged to deflect downwardly and rearwardly any earth or the like which is thrown up.

Between the rotor 9 and the rear baffle plate 21 are disposed rods 22 which extend approximately vertically after the style of a rake and which are arranged to sieve and distribute any earth thrown up in such a manner that larger pieces of earth are first intercepted by the rods 22 and deposited, while more finely crumbled earth is deflected downwardly only by the baffle plate 21 after passing through the grid rods 22, so that a layer of earth covered by finely divided soil is obtained.

At the rear end of the soil cultivation implement a clod-breaking roller 15 is connected to the frame 1 by means of roller carriers 16 which are adjustable in height. The clod-breaking roller 15 supports the implement at its rear end, so that it carries the implement in conjunction with the supporting roller 3, and where applicable, with the pronged rotor 9. In addition, the clod-breaking roller 15 ensures superficial loosening and structuring of the cultivated soil. For this purpose the clod-breaking roller 15 is composed of individual toothed discs 15b which are mounted on a shaft 15a and which have rounded teeth 15c of the profile shown in FIGS. 1 and 2. The various toothed discs 15b are slightly offset in relation to one another, so that the rows of teeth are distributed helically over the periphery of the roller, as indicated by the dot-and-dash lines 15c'. Through this arrangement an undesirable combing effect is avoided and uniform distribution of the soil is achieved.

Between the pronged rotor 9, or more strictly speaking the rear baffle plate 21, and the clod-breaking roller 15 are disposed nozzle tubes 19 through which pourable or flowable material can be introduced into the soil. This material is stored in a container 17 mounted on the frame 1 and is fed into the nozzle tubes 19 through a controllable container outlet 17a and supply pipes 18.

In an arrangement of this kind media combatting pests and/or weeds, namely herbicides or pesticides, fertilizers, or seeds, in granular or liquid form, can be selectively introduced into the ground simultaneously with the cultivation operation.

Depending on the nature of the ground and the desired method of cultivation, the supporting roller 3, the pronged rotor 9, and the clod-breaking roller 15 are adjusted in height. It is also possible for the operation to be performed with the supporting roller 3 and/or the clod-breaking roller 15 clear of the ground.

The construction of the pronged rotor 9, which is shown in more detail in FIGS. 4 to 8, is very important if the soil cultivation implement is to be of practical use. Thus, power requirements only occur when the prongs 92 penetrate into the surface of the ground after the style of blades. In order to achieve this penetration the prongs 92 are mounted on the periphery of the rotor shaft 91 by way of receiving bushes 93 which project approximately radially with respect to the shaft 91. Hence, the prongs 92 extend substantially in a tangential direction. It is important that the angle between the center line of each prong and the associated radius should be smaller than 90° and preferably between 50° and 80°. In addition, as shown most clearly in FIGS. 6 to 8 the front end 92a of each prong should be curved in the form of a blade in the direction of rotation and the prongs should be provided with a hollow channel 96 so as to form a narrow blade. Since these prongs are very highly stressed, it is advantageous for them to be made of forged steel. In order to enable them to be replaced in a simple manner in the event of damage or fracture, their fastening pins 95 are each bolted to the respective receiving bush 93 by way of a threaded bolt 94.

For soil cultivation and for the necessary power requirement the configuration and arrangement of the share cutters which are shown most clearly in FIGS. 9 to 13 are important. The inner share cutters 7 have a substantially triangular external contour along which the cutting edges 72 are provided. Reasonable working results with lowest possible power consumption are obtained if the cutting edges 72, which are disposed symmetrically to the center axis 76, include an angle of about 75°. The outer share cutters 7' correspond in construction to one half of the share cutters 7 shown in FIGS. 9 and 10.

Figure 11:
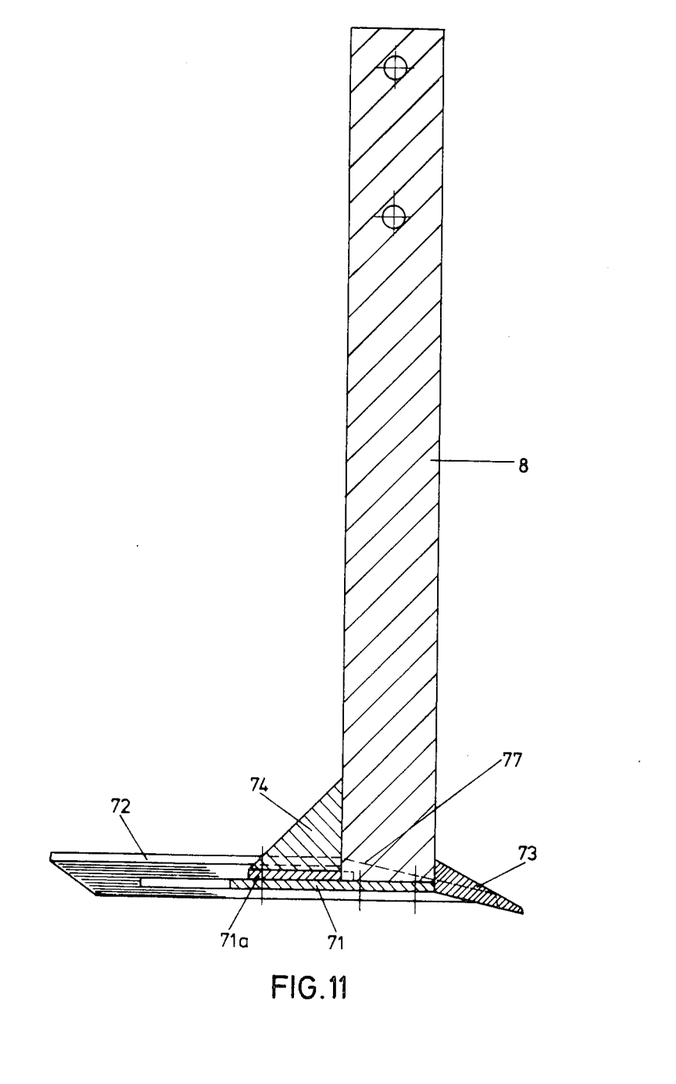
FIG. 11 shows a section taken on line XI—XI of FIG. 10.

The cutting edges 72 each have a cutting surface which rises slightly in relation to the horizontal, as indicated by broken lines 77 in FIG. 11, only at the front end (in the working direction). This surface is at an angle between 10° and 30° in relation to the horizontal.

Figure 12:
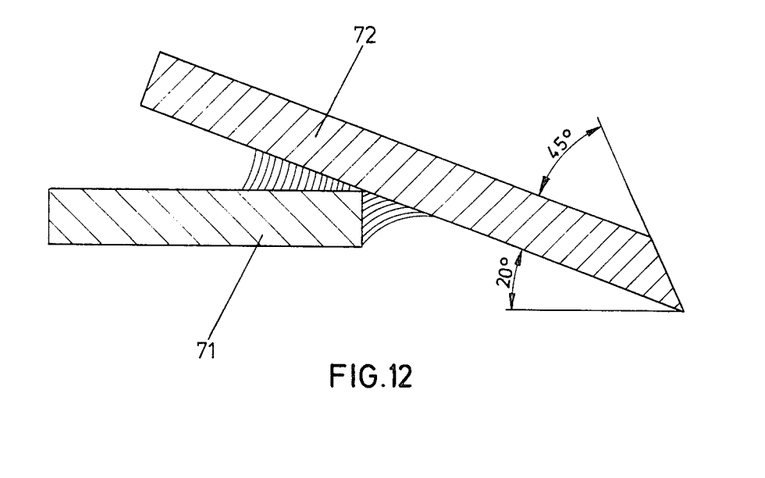
FIG. 12 shows a section taken along line XII—XII of FIG. 10.

This inclined cutting surface is followed by a rear cutting surface which extends in the horizontal direction and which, as shown in FIG. 12, is at an angle of about 20° in the outward direction. The outer cutting edges of the cutters 72 are tapered.

Figure 13:
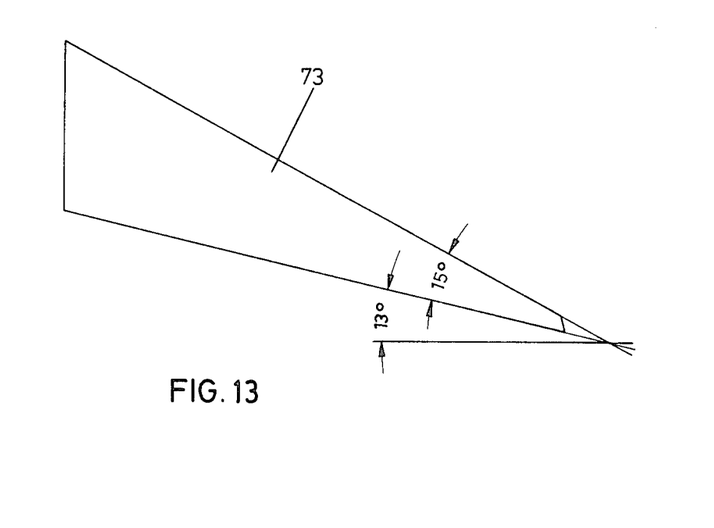
FIG. 13 shows a side view on a larger scale of an undercutter of the cutter share of FIGS. 10 to 12.

At their front end (in the working direction) the share cutters are each equipped with a so-called undercutter 73 whose top cutting surface has a greater inclination in relation to the horizontal, for example 30°, than the corresponding cutting surface 77 of the cutters 72. By means of this undercutter the cutters are pulled into the ground when the implement is in use, so that in conjunction with the supporting roller 3 a substantially constant cultivation depth is obtained.

In the embodiment illustrated, the cutters 72 and the undercutter 73 are joined, preferably by welding, to a baseplate which is composed of two parts 71 and 71a. The baseplate forms a recess which is open at the top and into which the bottom end of the cutter holders can be inserted. In a simple manner the baseplate with the cutters 72 and undercutter 73 is screwed from below to the holder 8 by way of countersunk screws 75. Despite the high loading this simple connection is adequate because during operation the undercutter 73 can be supported by its rear end against the front of the cutter holder 8. For the purpose of taking vertical loads a trangular stiffening rib 74 is provided between the baseplate 71a and the cutter holder 8.

In the event of damage to the cutting edges 72 and undercutter 73 fastened to the baseplate 71, it is only necessary for the screws 75 to be unscrewed, so that a simple replacement of these parts, which are subject to wear, is possible at the actual utilization site. If necessary, individual cutter edges of the undercutter 73 may be detachably and therefore exchangeably fastened to the baseplate 71.

Although the present invention has been described in some detail by way of illustration and exaple for purposes of clarity of understanding, it will, of course, be understood that various changes and modifications may be made in the form, details, and arrangements of the parts without departing from the scope of the invention as set forth in the following claims.

What we claim is:

1. A soil cultivation implement comprising a frame comprising means adapting the implement to be coupled to a prime mover and including means adapted to be coupled to a source of rotary power for driving a rotor and having disposed thereon, one behind the other in the direction of travel, rotary cutters for cutting up the ground vertically, plowshare-like cutters disposed side by side for dividing the ground horizontally, a horizontal rotor having prongs and serving as a clod-breaking roller, and being adapted to be rotationally driven and a freely rotating clod packing roller for firming the ground without substantially compacting the soil; said plowshare-like cutters having cutting edges which are disposed at an acute angle with respect to one another and symmetrically with respect to the longitudinal axis and having at their front end in the working direction an angle of inclination in relation to the horizontal of about 10° to 30°; said rotor having a rotor shaft on which there are disposed in a helical manner wedge-shaped, substantially linear prongs in at least three rows spaced uniformly around the circumference of the rotor shaft, said prongs being rigidly fastened substantially tangentially on said rotor shaft and being located each on the leg of the tangent leading with respect to the direction of rotation of the rotor shaft at an angle of about 50° to 80° in relation to radii associated with their fastening points, the length of each prong being substantially in the proportion of about 2:1 as compared to the diameter of the rotor shaft and said prongs being pointed at their outer ends and said linear prong comprising a camfered digging end curved in a shovel-like manner in the direction of rotation; and said clod packing roller being provided on its surface with rounded teeth helically offset in relation to one another and aligned in rows around and helically across said roller for firming the surface of the soil.

2. A soil cultivation implement as claimed in claim 1, wherein the prongs are disposed on the rotor shaft in five-staggered rows.

3. A soil cultivation implement as claimed in claim 1, including means for height adjustment of the pronged rotor.

4. A soil cultivation implement as claimed in claim 1, wherein the clod-packing roller comprises means for vertical a adjustment and a plurality of toothed discs disposed side by side on an axle, and said discs having said rounded teeth which are helically offset in relation to one another.

5. A soil cultivation implement as claimed in claim 1 above further including baffle plates behind the pronged rotor, said baffle plates spaced apart from one another and further including between the pronged rotor and the rear baffle plate, substantially vertical resilient rods to form a rake.

6. A soil cultivation implement as claimed in claim 1 further comprising a material dispensor having a controllable outlet connected thereto, comprising connecting pipes and distributor nozzles behind the pronged rotor.

7. A soil cultivation implement as claimed in claim 1 wherein receiving bushes are disposed on the periphery of the rotor shaft, and project substantially radially, and each prong is detachably and exchangeably received in a respective bush.

8. A soil cultivation implement as claimed in claim 7, wherein each prong carries a threaded end pin screw connected in said respective bush.

9. A soil cultivation implement as claimed in claim 1 wherein said rotary cutters include vertically adjustable supporting rollers means.

10. A soil cultivation implement as claimed in claim 9, wherein the supporting roller means extends over only part of the working width and wherein there is disposed a share-like cutter on each end of said supporting roller means and wherein behind said supporting roller means at least two share-like cutters are disposed, said share-like cutters forming said second cutting means.

11. A soil cultivation implement as claimed in claim 1, wherein said plowshare-like cutters comprise two cutting edges which subtend at an angle between 60° and 90°.

12. A soil cultivation implement as claimd in claim 11, wherein said plowshare-like cutters comprise two cutting edges subtend an angle of 75°.

13. A soil cultivation implement as claimed in any of claims 11 or 12, wherein the cutting edges comprise rear ends which extend substantially horizontally and drop obliquely outwardly.

14. A soil cultivation implement as claimed in claim 13, wherein the cutting edges drop obliquely outwardly at an angle of 20°.

15. A soil cultivation implement as claimed in any of claims 11 or 12, wherein said plowshare-like cutters are each provided with an undercutter which in relation to the horizontal has a greater inclination than that of said cutting edges.

16. A soil cultivation implement as claimed in claim 15, wherein each undercutter is at an angle of 30° to the horizontal.

17. A soil cultivation implement as claimed in claim 15, wherein the outer cutting surfaces of the cutting edges and of the undercutter are bevelled.

18. A soil cultivation implement as claimed in claim 15, further comprising means for detachable attachments of the plowshare-like cutters and the undercutters.

19. A soil cultivation implement as claimed in claim 18, wherein the cutting edges and the undercutter of each cutter are mounted on a triangular baseplate having an upper face comprising a cutout corresponding to the end of a cutter holder mounted on the frame and is screwed from below to the cutter holder by means of countersunk screws.

20. A soil cultivation implement as claimed in claim 19, wherein the cutter holders include means for height adjustment.

* * * * *